United States Patent [19]
Barnes

[11] Patent Number: 5,823,268
[45] Date of Patent: Oct. 20, 1998

[54] TRAILER HITCH ANTI-SWAY DEVICE

[76] Inventor: Ronny L. Barnes, R.R. 1, Box 73-A, O'Donnell, Tex. 79351

[21] Appl. No.: 806,086

[22] Filed: Feb. 25, 1997

[51] Int. Cl.$^6$ .................................................. A01B 59/043
[52] U.S. Cl. .......................................... 172/450; 280/474
[58] Field of Search .................................. 172/450, 449, 172/457, 501, 504; 280/497, 474

[56] References Cited

U.S. PATENT DOCUMENTS

| | | | |
|---|---|---|---|
| 2,987,126 | 6/1961 | Horney | 172/450 |
| 3,581,828 | 6/1971 | Thune | 172/450 |
| 3,627,060 | 12/1971 | Lemmon | 172/450 |
| 3,709,304 | 1/1973 | Haupt | 172/450 |
| 3,721,302 | 3/1973 | Buchmuller et al. | 172/450 |
| 3,847,228 | 11/1974 | Slosiarek et al. | 172/450 |
| 3,888,316 | 6/1975 | Azzarello et al. | 172/450 |
| 3,910,355 | 10/1975 | Elfes et al. | 172/450 |
| 4,116,458 | 9/1978 | Berg | 172/450 X |
| 4,181,181 | 1/1980 | Old | 172/450 X |
| 4,203,613 | 5/1980 | Kunze | 172/450 |
| 4,265,464 | 5/1981 | Lange | 172/450 |
| 4,268,057 | 5/1981 | Engelmann et al. | 172/450 X |
| 4,470,613 | 9/1984 | Sykes | 172/450 |
| 4,506,773 | 3/1985 | Schott | 192/52 |
| 4,664,404 | 5/1987 | Schultz | 280/461 |
| 4,711,460 | 12/1987 | Schmittbetz | 172/450 |
| 5,010,960 | 4/1991 | Barnes et al. | 172/1 |
| 5,246,077 | 9/1993 | Tjaden et al. | 172/450 |

FOREIGN PATENT DOCUMENTS 2718959  11/1978  Germany ................................. 172/450

OTHER PUBLICATIONS

3–Pt. Hitch Stabilizer, The Best of Farm Show—1990 Edition, one page, Dec. 1989.

*Primary Examiner*—Terry Lee Melius
*Assistant Examiner*—Victor Batson
*Attorney, Agent, or Firm*—Wendell Coffee

[57] ABSTRACT

A stabilizing device comprising a rigid anti-sway roller journalled about a wear axle is mounted on an agricultural tractor. The device provides a rigid stabilizing opposing force between the draft links and the rear structure of the tractor, while allowing the draft links to be easily raised and lowered. The device also includes a special assembly whereby the stabilizing force can be varied by adjusting the distance between the roller and the rear structure. The adjustment is accomplished by rotation of a nut on a connecting bolt or rotation of a threaded bolt thus eliminating the need for adjustment shims.

15 Claims, 4 Drawing Sheets

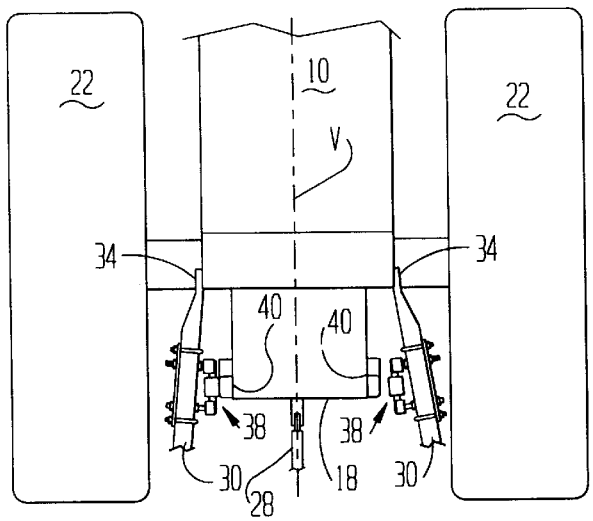
FIG 1
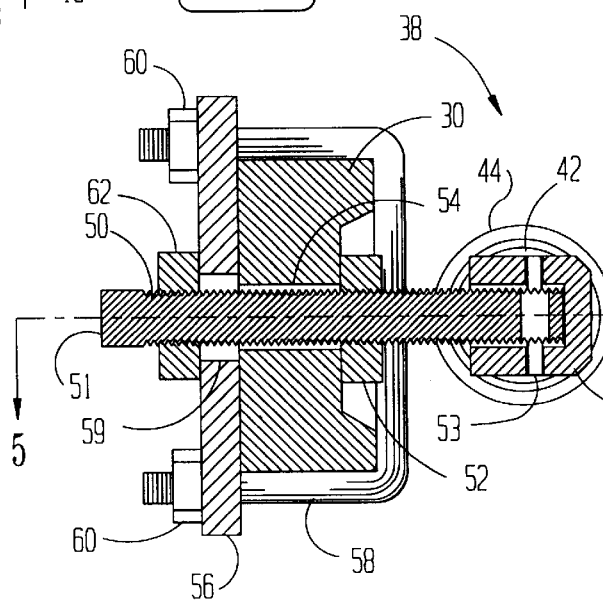
FIG 2
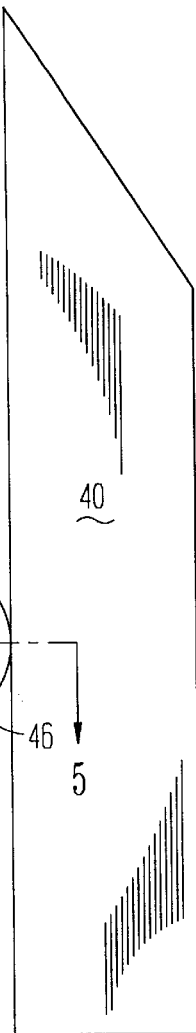
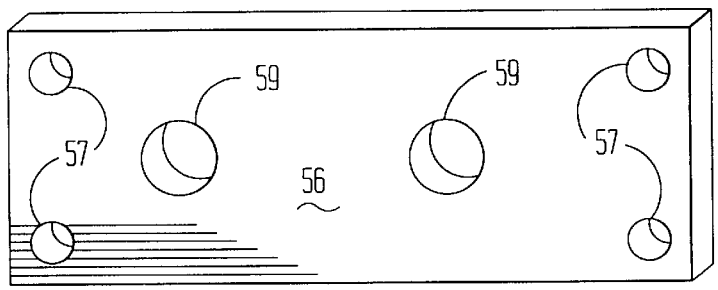
FIG 3

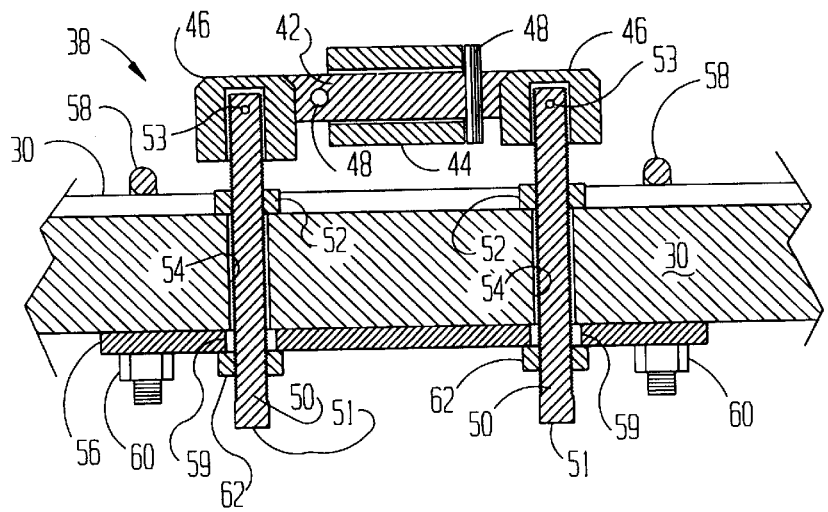
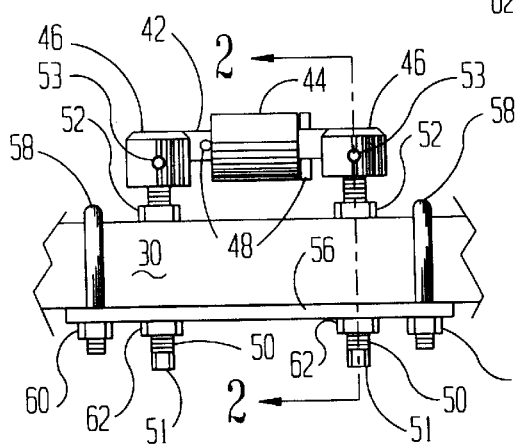
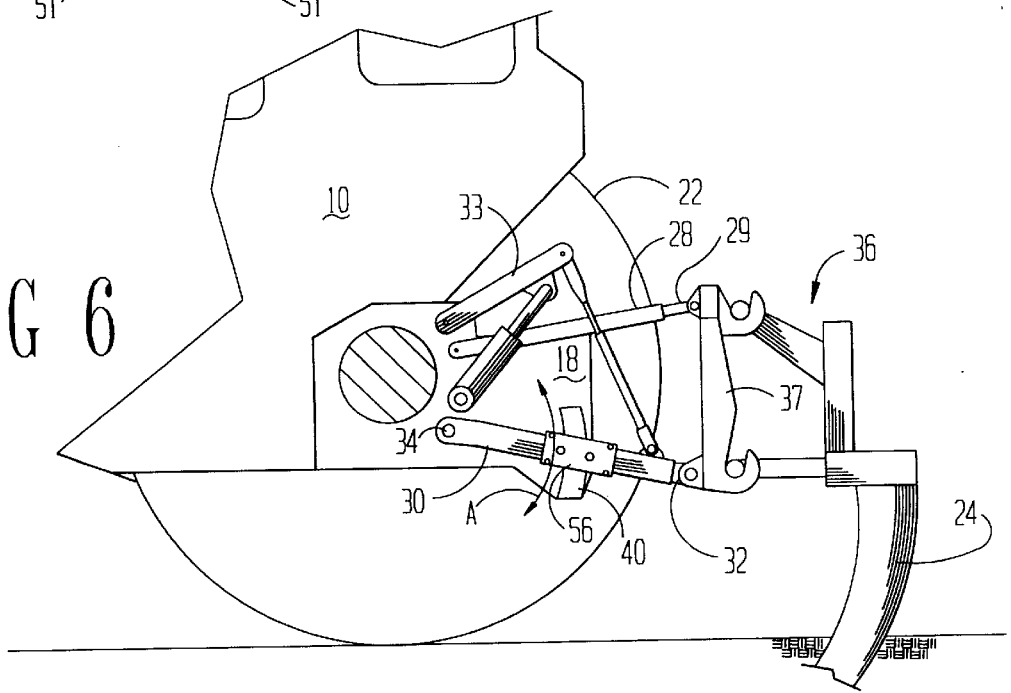

TRAILER HITCH ANTI-SWAY DEVICE

CROSS REFERENCE TO RELATED APPLICATION

Provisional Patent Application

Applicant filed a Provisional Application on this subject matter on Mar. 29, 1996, Ser. No. 60/014,289. Specific reference is made to that document.

BACKGROUND OF THE INVENTION (1) Field of the Invention

This invention relates to earth working and more particularly to agricultural tillage. Farmers have ordinary skill in this art.

(2) Description of the Related Art

For many years, farm tractors have been used to draft tillage equipment, and particularly heavy tillage equipment, through fields. "Heavy tillage equipment" specifically refers to tillage equipment that tills the soil deeply, e.g. over 3 inches. Besides turning plows and rippers, listers are a common type of such equipment.

As a result of agricultural development in the United States and increased labor costs, extremely large tractors are used to enable a single farmer to till a large area of land. As used herein, "large tractor" means a tractor having over 45 horse power. At a time when labor costs were less, it was economically feasible to use small tractors. Now, the use of smaller tractors is prohibitively expensive because each tractor requires a human operator. Therefore, for many years, the trend in United States agriculture has been to use larger and larger tractors.

Farmers have always had difficulty plowing straight furrows. Surface indentation, rocks, clumps of weeds, grasses and roots, steering corrections, and other causes of lateral shifts, jumps, jerks, and wiggles of the implement seem uncorrectable with prior art equipment. In fact, a lateral sway was designed into the hitch (Morling, pages 7 and 11). (Roy W. Morling, *Agricultural Tractor Hitches Analysis of Design Requirements.* No. 5, Dec. 12, 1979, published by ASAE, P.O. Box 410, St. Joseph, Mich. 49805).

Typically, these large tractors have low pressure pneumatic tires, which prevent undue compaction of the ground under the wheels by distributing the weight of the tractor over a large area. However, large tires with low air pressure tend to result in a lack of lateral stability. The frame of the tractor tends to move back and forth laterally, even though the tread of the tires may follow the directed path. The tires themselves permit the wheels, and thus the frames, to move.

A further complication arises because with long tool bars, an implement may extend across areas of soil with differing characteristics. For example, plows on one end of a toolbar may be plowing in tightly packed or rocky soil while plows on the other end are plowing in soft soil.

The problem of lateral movement in the agricultural implement or tool being used results in a limit to the precision with which the farmer can plow or cultivate a straight row. Various agricultural tools, such as coulters or discs, have been designed to be connected to the implement to minimize these lateral shifts, but have not resulted in an optimal solution to the problem. Additionally, a lack of lateral stability has been considered to be a factor in the overall efficiency of the vehicle, and increasing lateral stability has been sought as a way to increase efficiency.

"Soil Dynamics in Tillage and Traction" by William R. Gill and Glen E. Vanden Berg, a publication of the Agricultural Research Service of the United States Department of Agriculture, U.S. Printing Office 1967 discusses this and other problems. Gill and Berg indicate at page 340 that the efficiency of power transmission from the rear axle through the tires into tilled agricultural soil is perhaps no better than 50 percent (as applicant understands the discussion).

A second way of increasing the lateral stability is through the use of a stabilizing framework, as disclosed in BARNES, ET. AL. U.S. Pat. Nos. 4,655,295 (Apr. 7, 1987); 4,860,833 (Aug. 29, 1989); 4,905,769 (Mar. 6, 1990); 5,010,960 (Apr. 30, 1991). These Patents all seek to solve the problem of minimizing the lateral sway or shift in agricultural tractors and implements by attaching extensive framework to the frame of the tractor and the implement to form an improved draft connection.

SCHULTZ, U.S. Pat. No. 4,644,404 (May 12, 1987) discloses a rear weight and hitch assembly in which the rear draft links are laterally stabilized to the rear assembly (which is rigidly connected to the tractor frame) by use of a sway plate and an abutting sway pad. The sliding frictional contact between the plate and the pad wears down both parts quickly. The wearing down of the pad and plate requires the distance between them to be adjusted often, as the device is only effective when the plate and pad are in direct contact. These adjustments are customarily made by inserting shims to laterally shift the pad. When the pad is worn so far that it can no longer be shimmed properly, the pad must be replaced.

SUMMARY OF THE INVENTION (1) Progressive Contribution to the Art

Applicant's invention includes the addition of anti-sway rollers to the draft links between the draft link face and the sway plate. The roller is adjusted to be firmly in contact with the sway plate, thus imparting an expansive force between the draft link and the rear structure. Because the rollers maintain a constant force against the plates, the draft links may be raised and lowered while still maintaining the rigidity of the rear structure.

This invention supersedes the use of a sway pad, and provides a system of rolling friction, rather than sliding friction. The wear on the sway plate is greatly reduced. Further, this invention utilizes a system for providing periodic tightening or adjustment through the use of a micrometer-like expansion bolt, eliminating the need for the addition of shims.

(2) Objects of this Invention

An object of this invention is to improve the rigidity and lateral stability between an agricultural tractor and an implement used to till or work a field.

Further objects are to achieve the above with a device that is longlasting, sturdy, compact, durable, lightweight, simple, safe, efficient, versatile, ecologically compatible, energy conserving, and reliable, yet inexpensive and easy to manufacture, install, adjust, and maintain.

Other objects are to achieve the above with a method that is rapid, versatile, ecologically compatible, energy conserving, efficient, and inexpensive, and does not require highly skilled people to install, adjust, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is bottom plan view of a farm tractor with a first embodiment of the invention. The distal ends of the draft links have been broken away for clarity.

FIG. 2 is a lateral cross-sectional view of the first embodiment of the invention as installed on an agricultural tractor, taken substantially along line 2—2 of FIG. 4.

FIG. 3 is a perspective view of the reinforcing plate used in the first embodiment.

FIG. 4 is a top plan view of the first embodiment.

FIG. 5 is a longitudinal section of the first embodiment taken substantially along line 5—5 of FIG. 2.

FIG. 6 is a side elevational view of the first embodiment installed on a tractor. For clarity, a portion of the agricultural tractor has been broken away.

CATALOGUE OF ELEMENTS

Figure 7:
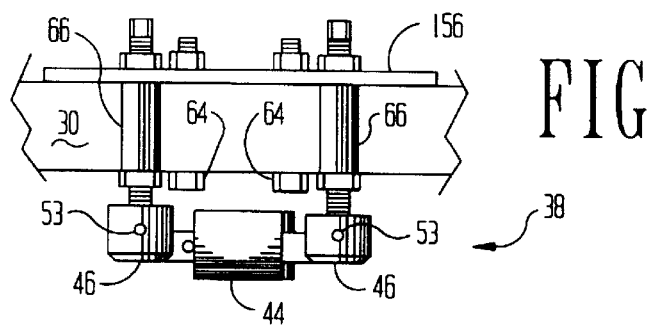
FIG. 7 is a top plan view of a second embodiment of the anti-sway device, as installed on a draft link. For clarity, a portion of the draft link has been broken away.

As an aid to correlating the terms of the claims to the exemplary drawing(s), the following catalog of elements is provided:

10 agricultural tractor
18 rear structure
22 rear wheels
24 tillage or earth working implement
28 top adjustment link
29 adjustment link distal end
30 draft links
32 distal end of draft link
33 lift arms
34 pivots
36 implement structure
37 quick hitch assembly
38 anti-sway assembly
40 sway plate
42 axle
44 roller
46 cup
48 roll pin
50 bolt
51 square head of expansion bolt
52 adjustment nut
53 expansion bolt pins
54 holes in draft links
56 reinforcing plate
57 U-bolt holes
58 U-bolts
59 expansion bolt holes
60 u-bolt nuts
62 locking jam nuts
64 pressure element bolt
66 expansion bolt collars
V vertical center line of rear structure
A arc of movement of draft links
156 reinforcing plate
159 bolt holes
238 assembly
242 axle
244 roller -continued 246 needle bearing
247 axle-groove
248 balls
249 plug
250 threaded bolt
251 threaded bolt head
256 axle holder
258 axle guide
260 plow bolt
262 jam nut
264 shoulders
266 loop
268 shoulders

DESCRIPTION OF THE PREFERRED
EMBODIMENTS(S)

Referring to the drawings, there may be seen a typical agricultural tractor 10. (FIGS. 1 and 6) Basically, the tractor will include a rear structure 18, mounted to the rear of the tractor and between the two drive wheels 22. This rear structure has a vertical center line V, and has two pivots 34 at the same elevation, mounted one on each side of the center line. A draft link 30 is journalled to each of the pivots. Both draft links extend rearwardly and outwardly to their distal ends 32, where they are adapted to be connected to agricultural implement structure 36. It will be noted for the purposes of this invention that the distal ends of the draft links are spaced equally apart from the center line.

Top adjustment link 28 is mounted to the rear structure at the center line, and extends rearwardly, where it terminates at its distal end 29.(FIG. 6) Together, the two draft links and the top link describe a standard three point hitch system, which is often mounted to a quick hitch yoke assembly 37, but may also be directly connected to an agricultural implement. As used in this application a quick hitch assembly 37 is to be considered a type of agricultural implement.

Two lift arms 33 are mounted upon the upper portion of the rear structure. Each lift arm is connected by a connecting rod to one of the draft links near, but spaced forward of its distal end 32. Therefore, it can be seen that by raising or lowering the lift arm, the draft links, and therefore the implement is raised and lowered about the pivot 34 at its proximal end. During this operation, it will be understood that the movement of the draft links causes all points thereon to describe an arc, such as arc A (FIG. 6).

According to the present invention, to modify a tractor with sway pads, the sway pads on the draft links are removed and replaced with a unit comprising rigid anti-sway roller 44 journalled about wear axle 42. This unit is located on the medial flank of the draft link, extending along the longitudinal axis of the draft link, and opposite the sway plate 40, as shown in FIGS. 1 & 2.

An example of a specific embodiment of the anti-sway assembly 38 which works well includes an anti-sway roller 44, journalled about a wear axle 42. The roller 44 is approximately three inches long, with an outside diameter of 2.25 inches and an inner diameter of 1.5 inches. The axle 42 is approximately 4.25 inches long with a diameter of 1.4375 inches. It will be understood that these and other dimensions could differ, (for example the inside diameter of the roller may be one ¹⁄₆₄" larger than the outside diameter of the axle), but as expressed in this application represent suitable dimensions.

The roller 44 and axle 42 are constructed of steel. It will be understood, however, that the roller in particular, and perhaps the axle, could be manufactured out of some other metal, or of a heavy, strong, rigid, and extremely durable plastic.

Two steel roll pins 48 are inserted into holes in the wear axle. These pins are used to maintain the anti-sway roller in its longitudinal position along the length of the axle. These pins are optimally at right angles to each other, and are both at right angles to the longitudinal axis of the wear axle, so that maximum positional stability is provided to the anti-sway roller.

A cup 46 is connected to each end of the wear axle, to receive the ends of two threaded attachment or connecting or expansion bolts 50. The opening in the cup forms a loose, oversized fit with the ends of the bolts, so that the ends may rotate freely inside the cups. The proximal end of each expansion bolt is inserted into its corresponding cup, and an adjustment nut 52 is threaded onto the bolt. The distal end of each bolt terminates in a square head 51, by which the bolt may be firmly grasped and rotated or held stationary during adjustment of the nut.

By one means of securing expansion bolts 50 in cups 46, a hole is drilled diametrically through the cup, at right angles to the longitudinal axis of the axle 42. A corresponding, but slightly larger, hole is drilled through the end of the expansion bolt. Steel expansion bolt pin 53 is inserted into the hole. This means of securing the bolt prevents rotation of the bolt, but allows the bolt to yaw slightly within the cup. The anti-sway assembly is held firmly on the bolt by the pin, and square bolt head 51 is unnecessary when the expansion bolt pins 53 are utilized.

Existing holes 54 for the sway pads on the medial flank of each draft link are enlarged. When enlarged these holes are slightly larger than the outside diameter of the expansion bolt, but smaller than the outside diameter of the adjustment nut. The anti-sway roller and axle assembly, with expansion bolts inserted, is then installed on the medial flank of the draft link, by inserting the bolts into the holes. It will be understood that the adjustment nuts on the expansion bolts abut the surface of the draft link, and therefore limit the depth of insertion of the bolts into the holes in the draft link. The draft link is then moved into its position. The implement fixes the span of the draft links and holds the improved anti-sway assembly securely in place.

Reinforcing plate 56 is constructed from a piece of heavy gauge steel, about ½ inch in thickness, and is cut to a rectangular shape with width slightly greater than the width of the draft link (about 6 inches), and length slightly greater than the entire length of anti-sway assembly 38 (about 12 inches). The plate has four U-bolt holes 57, one in each corner of the plate, and two expansion bolt holes 59 located along the longitudinal center line of the plate. The expansion bolt holes correspond to the holes 54 in the draft link.

The reinforcing plate is placed abutting the lateral flank of the draft link, with expansion bolt holes 59 aligned with holes 54 in the draft link, and over the exposed ends of expansion bolts 50. The plate is secured by two U-bolts 58, which pass around the medial flank of the draft link and through U-bolt holes 57 in the plate. The U-bolts are secured by U-bolt nuts 60. This holds the plates firmly in place. The reinforcing plate acts to provide support for anti-sway assembly 38 and to improve the structural strength of the modified link 30.

Following attachment of the reinforcing plate, two jam or locking nuts 62 are loosely threaded onto the expansion bolts 50 on the lateral flank of the draft link 30 and the plate. Once the assembly is firmly connected in place, the adjustment nuts 52 are turned to increase the distance between the draft link flank and the wear axle and roller assembly, until the assembly is brought into full contact with the sway plate 40 on the rear structure. The nut is then turned an additional fractional turn to force the axle away from the draft link, thus imparting an expansion force of the anti-sway assembly against the sway plate.

Jam nuts 62 are then tightened firmly against reinforcing plate 56. This acts to rigidly fix expansion bolts 50 in their position in holes 54, as well as to prevent travel of adjustment nuts 52 along the length of the expansion bolts. This rigidly fixes the position of the adjustment nuts, and therefore the lateral position of anti-sway assembly 38. The operation is repeated for the other draft link.

Although the specific elements of the first embodiment have been identified specifically, it will be understood that the entire assembly which is attached to the draft links 30 might well be called a unit. Also that the sway plates 40 are one form of sway element and that also the roller 44 is also a sway element. Also it will be understood that the expansion bolts 50 together with the adjustment nuts 52 are the micrometer-like threaded elements whereby the distance between the wear axle and draft link may be varied. Likewise, although the sway plates 40 in some cases are part of the integral rear structure 18 of the tractor that the rear structure may be thought of as a support structure to which the sway plates are attached. That part of separation between the sway plates and the rear structure is the connecting structure. Although it is not shown as an element it will be understood that the sway plates could be made to be adjustable as to their distance with the centerline.

Likewise the draft links themselves are support structure for the rollers 44 and the cups, bolts, and nuts are adjustment elements which form a micrometer-like connecting structure between the support structure and the sway element in the form of the roller.

The wear axles 42 may be attached to the cups 46 by different means. For example, they could be welded thereto. Also holes could be drilled through the sidewalls of the cups and the wear axle 42 inserted through the holes in sidewalls of the cups with the ends of the wear axle butting the bolts 51.

Figure 8:
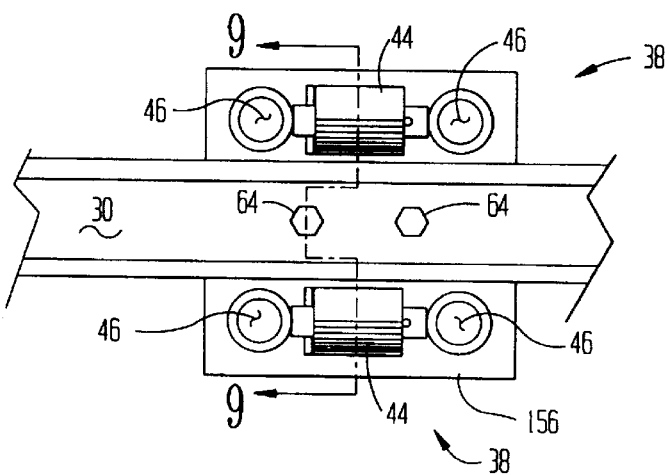
FIG. 8 is a side plan view of the second embodiment of the invention using dual rollers, as installed on a draft link. For clarity, a portion of the draft link has been broken away.
Figure 9:
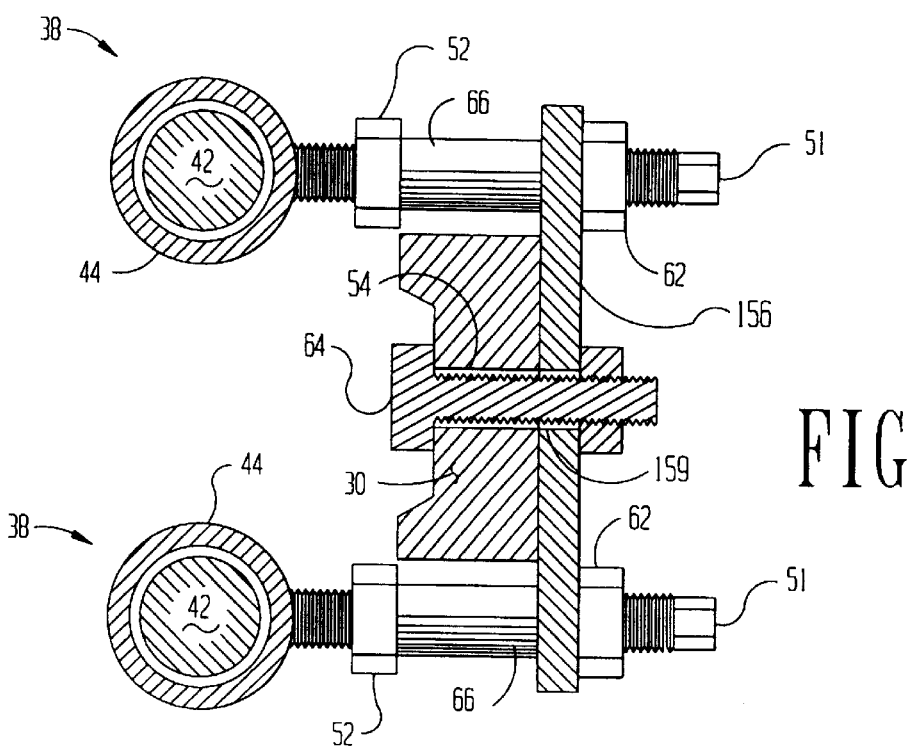
FIG. 9 is a cross-sectional view of the second embodiment taken substantially along line 9—9 of FIG. 8.

A second embodiment of the anti-sway device may be seen in FIGS. 7–9. Looking at these figures, it may be seen that two anti-sway assemblies 38 are used, each including anti-sway rollers 44, journalled about wear axles 42, as described above. These assemblies are connected to the draft link 30 via an enlarged reinforcing plate 156. The bolts 50 are held in place by collars 66 connected to the plate concentrically with holes 159. The plate is connected to the link by pressure element bolt 64, through holes 54.

The second embodiment has the advantage that no enlargement of holes 54 is required, as bolt 64 is sized to the existing holes in the draft link. Additionally, two anti-sway assemblies 38 on each draft link 30 act in concert to provide firm contact with plate 40 at all times, thus providing increased lateral stability over use of a single anti-sway assembly on each link. As before the connecting structure and support structure is readily identifiable.

To adjust the pressure between the anti-sway assembly and the plate, jam nuts 62 are loosened. Adjustment nuts 52 are turned until the position of the anti-sway assembly is adjusted to the desired position or pressure. In this way, the adjustment nuts work in concert with the expansion bolts to form a micrometer adjustment means. Once the adjustment is complete, the jam nuts are then firmly tightened to secure the assembly in place.

The process for installation and adjustment of the anti-sway assemblies described herein are substantially similar for all embodiments, but for clarity are specified with reference to the first embodiment alone. The same steps are followed for all other embodiments, with only negligible variation.

Figure 10:
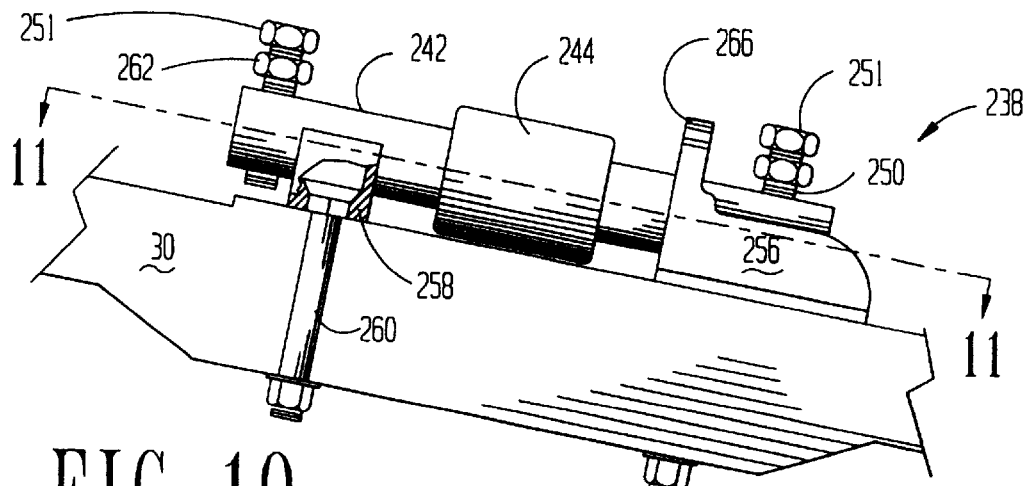
FIG. 10 is a top plan view of a third embodiment of the invention.
Figure 11:
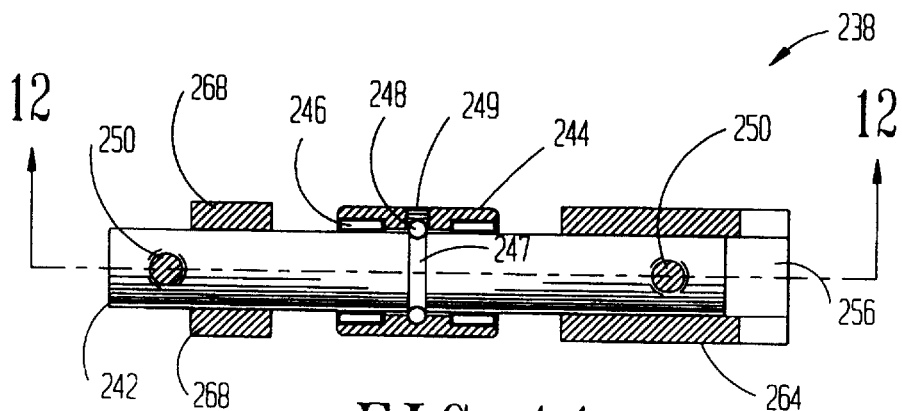
FIG. 11 is an longitudinal sectional view of the third embodiment with the draft link not shown for clarity, taken substantially on line 11—11 of FIG. 10.
Figure 12:
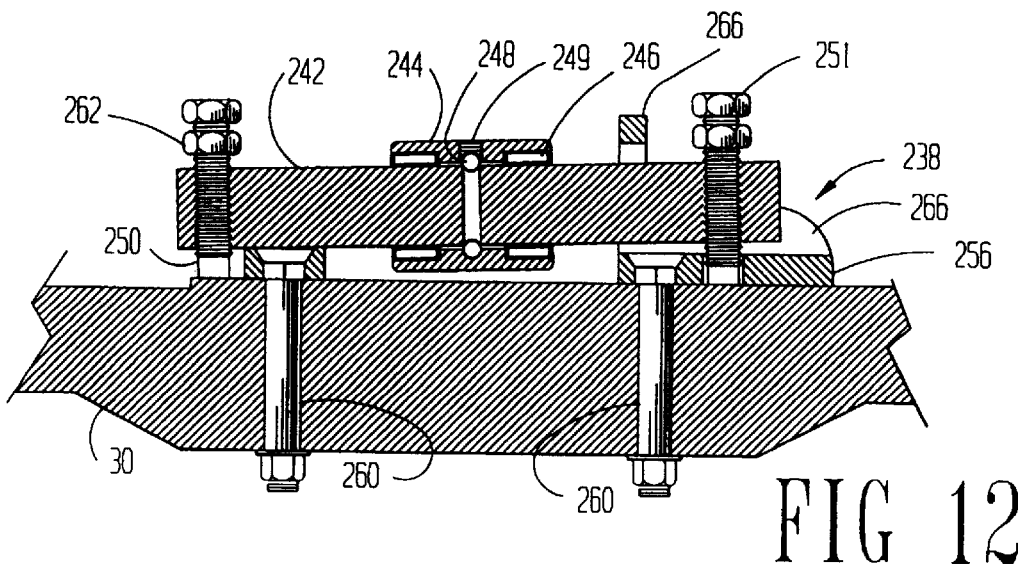
FIG. 12 is an longitudinal sectional view of the third embodiment taken substantially on line 12—12 of FIG. 11.

Referring particularly to FIGS. 10, 11, and 12 there may be seen a third embodiment of this invention.

The third embodiment shows an assembly 238.

In this embodiment, the wear-axle 242 has a diametrical bore at each end. The diametrical bores are parallel to each other. Threaded expansion bolts 250 are threaded through each of the bores. The bores also are threaded to receive them. The expansion bolts 250 have a noncircular head 251 and a locknut 262.

A axle holder 256 is bolted to the draft link 30 by bolt 260 extending through a bore in the draft link and secured in place. Preferably plow bolts are used so that the heads are flush.

The holder 256 includes two shoulders 264 which extend away from the draft link and extend to either side of the wear axle 242. The holder 256 also has a loop 266 extending around the wear axle adjacent to roller 244. On the other end of the wear axle and on the other side of the roller 244 axle guide 258 is also secured to the draft link 30 by a plow bolt 260. It likewise has shoulders 268 which extend away from the draft link on either side of the wear axle. Normally the wear axle is held in place within the shoulders of the holder and guide because of the pressure between the roller and sway plate. However instances where the draft link might be released from the agricultural implement and the draft link swing away from the sway plate, the loop 266 will prevent the wear axle from dropping away from the draft link.

Needle bearing 246 forms a bearing between the roller 244 and the wear axle 242. Needle bearings are well known and they include elongated, cylindrical bearings which will withstand heavy loads.

The roller is held in position on the wear axle by a circumferential groove 247 in the wear axle 242 and a mating or matching groove in the center of the roller 244. Balls 248 are placed through a radial bore. The purpose of the balls are not to function as bearings as much as to position the roller on the wear axle. The opening through which the balls are fed is closed by a suitable plug 248.

The groove and balls maintain the roller in position without rings on either end of the roller. This is preferred in as much as normally the needle bearing will have grease seals on either end which would be damaged by holding the bearings with rings. In addition to forming a inlet for the balls the hole plugged by the plug 248 may be used to feed lubricant into the needle bearings.

It will be noted that threaded bolt 260 is placed on each end of the axle. However it is possible, because of the angle of draft link 30, that the threaded bolt on the axle end adjacent to the guide 258 might not be necessary. Stated otherwise the wear axle at that point could rest against the base of the guide and the adjustment made solely by the threaded bolt on the holder.

Also according to the preferred design the holder has a bore immediately below the threaded bolt 250 therefore the threaded bolt bears directly against the draft link 30. It will be understood that without the bore that the threaded bolt would bear against the holder 256 which would transfer the pressure to the draft link. That is to say even without the bore that the bolt would press against the draft link 230 through the holder 256.

During operation with the assembly installed on an agricultural tractor, the farmer may freely raise and lower the draft links as usual. During this operation, the rollers roll about the axles, with little friction. Periodic adjustment on the wear axle expansion bolts, is used to maintain appropriate pressure between the roller and the sway plate.

The anti-sway assembly herein described is in the form generally of a pressure element, which maintains an expansive pressure in the three link hitch. Each of prior art sway pad and sway plate assembly is also classified as a pressure element. In the prior art, however, the sway pad and sway plate lacks a micrometer adjustment means. It will be understood therefore that the same means of mounting, with expansion bolts could be used in combination with other pressure elements, such as sway pads and pressure plates.

The embodiments shown and described above are only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. An anti-sway structure adapted to be mounted on an agricultural tractor, said tractor having:
   a) at least two drive wheels to propel the tractor in a direction of draft,
   b) a rear structure with a center line,
   c) a pair of pivots on the rear structure equidistant from the centerline and at the same elevation,
   d) a standard three link hitch attached to said rear structure, including:
      i) a top adjustment link, having a proximal and a distal end, said proximal end attached to the rear structure at the center line above the pivots,
      ii) two elongated lower draft links, each having a longitudinal axis extending between and defining a proximal end and a distal end, each link also having a medial flank adjacent to the center line, and a lateral flank distant from the center line, and each link having a height,
      iii) the proximal ends of said lower draft links journalled one to each of the pivots,
   e) an implement structure attached to the distal ends of the top link and the draft links thereby fixing the distance between similar points on the draft links,
   f) a means for raising and lowering the draft links, by rotating them about the pivot at the proximal end, thereby causing the draft links to have an arc of movement,
   g) sway plates on a support structure which is the rear structure adjacent to an area near the draft links,
   h) said sway plates extending in a direction parallel to the arc of movement of the draft links, and
   j) having a length such that a portion of the sway plates is always adjacent to the draft links throughout their arc of movement;
wherein said improved anti-sway structure comprises:
   jj) a unit which includes:
   k) at least one elongated wear axle on an axle support structure, said axle having two ends,

9 l) a rigid roller journalled about the axle, m) said unit adapted to be mounted on the medial flank of one of the draft links between the medial flank of the draft link and one of said sway plates with the wear axle extending in the direction of the longitudinal axis of the draft link; and n) a means for forcing the wear axle away from the draft link.

2. The combination including the structure as defined in claim 1 comprising:

p) a pair of said units, one unit connected to each draft link; and q) each of said rollers firmly contacting the adjacent sway plate.

3. The structure as defined in claim 2 wherein r) said means for forcing the wear axle includes:

s) at least one threaded bolt extending between the wear axle and the draft link, t) so arranged and constructed that a minimum distance of the wear axle to the medial flank may be adjusted.

4. The structure as defined in claim 2 wherein r) each roller forms a loose fit with the wear axle to which it is journaled, said loose fit is formed by the inside diameter of the roller being at least 1/64 of an inch larger than the outside diameter of the wear axle.

5. The structure as defined in claim 2 further comprising:

r) a needle bearing between said wear axle and said roller.

6. The structure as defined in claim 1 wherein the wear axle is connected to the unit by structure which includes:

p) two cups, q) each cup attached by its outer face to one end of the wear axle, r) threaded expansion bolts, each bolt having a proximal end and a distal end, s) the proximal end of each bolt inserted into a cup, t) the distal end of each bolt adapted to be inserted to a depth through one of a pair of holes in the draft link, such that the distal end is exposed on the lateral flank of the draft link.

7. The structure as defined in claim 6 and further comprising:

u) each threaded expansion bolt is a micrometer like threaded element whereby the distance between the wear axle and draft link may be varied.

8. The structure as defined in claim 6 and further comprising:

u) an adjustment nut on each bolt, located between two ends of the bolt, v) said adjustment nut having an outside diameter greater than the diameter of the holes in the draft links, w) said adjustment nut adapted to be positioned between the medial flank of the draft link and the cup, x) such that the adjustment nut will limit the depth of insertion of the expansion bolt into the hole in the draft link, y) such that rotation of the nut will adjust the distance between the anti-sway roller and the draft link, z) a locking nut adapted to be threaded onto each bolt at its distal end adjacent to the lateral flank of the draft link, and aa) a pin inserted diametrically through the cup and the expansion bolt rotationally immobilizing the bolt in said cup.

9. The structure as defined in claim 1 and further comprising:

10 p) a needle bearing between said wear axle and said roller.

10. The structure as defined in claim 1 further comprising:

p) a threaded diametrical bore through at least one end of the wear axle, q) a threaded bolt at least partially threaded in said diametrical bore thus forming at least a portion of said means for adjusting.

11. The structure as defined in claim 10 further comprising:

r) a needle bearing between said wear axle and said roller, s) a pair of said units, one unit connected to each draft link, and t) each of said rollers firmly contacting the adjacent sway plate.

12. An anti-sway structure adapted to be mounted on an agricultural tractor having:

a) at least two drive wheels to propel the tractor in a direction of draft, b) a rear structure with a center line, c) a pair of pivots on the rear structure equidistant from the centerline and at the same elevation, d) a standard three link hitch attached to said rear structure, including:

i) a top adjustment link attached to the rear structure at the center line above the pivots, ii) two elongated lower draft links, each having a longitudinal axis extending between and defining a proximal end and a distal end, and each link also having a medial flank adjacent to the center line, and a lateral flank distant from the center line, iii) the proximal ends of each of said lower draft links journalled to one of the pivots, e) an implement structure attached to the distal ends of the draft links thereby fixing the distance between similar points on the draft links, f) a means for raising and lowering the lift arms, by rotating them about the pivot at the proximal end, thereby causing the draft links to have an arc of movement, g) sway plates fastened by connecting structure to support structure in the form of the rear structure adjacent to an area near the draft links, h) said sway plates extending in a direction parallel to the arc of movement of the draft links, and j) having a length such that a portion of the sway plates is always adjacent to the draft links throughout their arc of movement;

wherein said improved anti-sway structure comprises:

k) a pair of sway elements for the draft links adapted to contact said sway plates, l) each of said sway elements for the draft links connected to one of said draft links by m) a micrometer-like threaded element which forms a means for forcing the sway element for the draft links away from the draft links.

13. The structure as defined in claim 12 further comprising:

n) said sway elements for links in the form of wear axles with a rigid roller journalled thereon.

14. The structure as defined in claim 12, wherein said connecting structure includes:

n) at least one expansion bolt, forming said threaded element, journalled to each sway element for links, said bolt having two ends, o) at least one hole in the support structure, at a point adjacent to the sway element for links, p) an adjustment nut threaded on each bolt, located between the two ends of the bolt, q) said adjustment nut having an outside diameter greater than the diameter of the hole in the support structure, r) said adjustment nut adapted to be positioned between the medial flank of the draft link and the sway element, s) such that the adjustment nut will limit the depth of insertion of the expansion bolt into the hole in the support structure t) such that rotation of the nut will adjust the distance between a pressure element and the sway plate, u) such that continued rotation of the nut past a point where the pressure element is in direct contact with the sway element for links will impart a stabilizing force between the sway element and the draft links, and v) a locking nut rigidly stabilizing said expansion bolt and said adjustment nut.

15. A method for tilling agricultural land with an agricultural tractor having:

a) at least two drive wheels to propel the tractor in a direction of draft, b) a rear structure with a center line, c) a pair of pivots on the rear structure equidistant from the centerline and at the same elevation, d) a standard three link hitch attached to said rear structure, including
  i) a top adjustment link attached to the rear structure at the center line above the pivots,
  ii) two elongated lower draft links, each having a longitudinal axis extending between and defining a proximal end and a distal end, and each link also having a medial flank adjacent to the center line, and a lateral flank distant from the center line,
  iii) the proximal ends of each of said lower draft links journalled to one of the pivots, e) an implement structure attached to the distal ends of the draft links thereby fixing the distance between similar points on the draft links, f) a means for rotating the draft links, about the pivot at the proximal end, thereby causing the draft links to have an arc of movement, g) sway plates fastened the rear structure adjacent to an area near the draft links, h) said sway plates extending in a direction parallel to the arc of movement of the draft links, and j) having a length such that a portion of the sway plates is always adjacent to the draft links throughout their arc of movement k) an anti-sway structure including
  i) a pair of sway elements for the draft links contacting said sway plates,
  ii) each of said sway elements for the draft links including connecting structure connecting said sway element for the draft links to one of said draft links, wherein the improved method comprises:

l) attaching a tilling implement to the implement structure, m) applying pressure between sway elements for the draft links and sway plates by n) rotating a threaded bolt in the connecting structures, thereby applying an expansion force between the sway elements and the sway plates.

* * * * *